United States Patent
Kuznetsov

(10) Patent No.: US 11,489,367 B2
(45) Date of Patent: Nov. 1, 2022

(54) POLYPHASE CONTACTLESS INDUCTION POWER TRANSFER SYSTEM FOR TRANSFERRING ELECTRICAL POWER ACROSS GAP

(71) Applicant: Raytheon Company, Waltham, MA (US)

(72) Inventor: Stephen Kuznetsov, Marlboro, MA (US)

(73) Assignee: Raytheon Company, Waltham, MA (US)

( * ) Notice: Subject to any disclaimer, the term of this patent is extended or adjusted under 35 U.S.C. 154(b) by 577 days.

(21) Appl. No.: 16/437,744

(22) Filed: Jun. 11, 2019

(65) Prior Publication Data
US 2020/0395784 A1    Dec. 17, 2020

(51) Int. Cl.
| | |
|---|---|
| H02J 50/10 | (2016.01) |
| H02J 50/90 | (2016.01) |
| H02K 1/17 | (2006.01) |
| H02K 41/025 | (2006.01) |

(52) U.S. Cl.
CPC .............. *H02J 50/10* (2016.02); *H02J 50/90* (2016.02); *H02K 1/17* (2013.01); *H02K 41/025* (2013.01)

(58) Field of Classification Search
CPC ...................................................... H02J 50/10
USPC ......................................................... 320/108
See application file for complete search history.

(56) References Cited

U.S. PATENT DOCUMENTS

| | | | | |
|---|---|---|---|---|
| 4,061,089 | A | * | 12/1977 | Sawyer .................. B60L 5/005 104/23.2 |
| 9,373,963 | B2 | | 6/2016 | Kuznetsov |
| 9,531,247 | B2 | | 12/2016 | Kuznetsov |
| 9,531,289 | B2 | | 12/2016 | Kuznetsov |

(Continued)

FOREIGN PATENT DOCUMENTS

| | | |
|---|---|---|
| WO | 2018004765 | 1/2018 |
| WO | 2019125723 | 6/2019 |

OTHER PUBLICATIONS

International Search Report and Written Opinion of corresponding International Application No. PCT/US2020/035159 dated Oct. 5, 2020.

(Continued)

*Primary Examiner* — Edward Tso
*Assistant Examiner* — Ahmed H Omar
(74) *Attorney, Agent, or Firm* — Renner, Otto, Boisselle & Sklar, LLP

(57) ABSTRACT

An inductive power transfer system is used for transferring electrical power across a gap, such as an air gap or a liquid gap, such as to unmanned autonomous vehicles (UAVs). The power transfer system is a polyphase system that creates a travelling magnetic field in the air or liquid gap, implementing a resonant electro-magnetic (EM) field to allow larger gap separations and less precise alignments. The power transfer system may have a polyphase dynamoelectric machine attached to primary mechanical-inertial storage device with multiple stator and rotor ports connected to a polyphase traveling-wave inductive power transmitter apparatus. The system may be of use in transferring power to underwater vehicles in a subsea salt water environment. Such a power transfer system may part of a larger system for underwater power transfer, for instance at depths of at least 10 km, and/or at distances of 1 to 50 km.

20 Claims, 10 Drawing Sheets

(56) References Cited

U.S. PATENT DOCUMENTS

| | | |
|---|---|---|
| 9,543,781 B2 | 1/2017 | Asselin et al. |
| 9,667,232 B2 | 5/2017 | Kuznetsov |
| 9,824,805 B2 | 11/2017 | Wechlin et al. |
| 11,183,846 B2 | 11/2021 | Kuznetsov |
| 2005/0073269 A1 | 4/2005 | Lewis |
| 2013/0285491 A1 | 10/2013 | Kuznetsov |
| 2014/0346868 A1* | 11/2014 | Kuznetsov ............... H02J 1/00 307/18 |
| 2015/0340860 A1 | 11/2015 | Tenca |
| 2016/0197600 A1 | 7/2016 | Kuznetsov |
| 2016/0336928 A1 | 11/2016 | Kuznetsov |
| 2018/0013312 A1* | 1/2018 | Moyer ................... H02J 7/025 |
| 2019/0036336 A1 | 1/2019 | Kuznetsov |

OTHER PUBLICATIONS

Pending claims of co-pending U.S. Appl. No. 16/437,750, filed Jun. 11, 2019.

\* cited by examiner

POLYPHASE CONTACTLESS INDUCTION POWER TRANSFER SYSTEM FOR TRANSFERRING ELECTRICAL POWER ACROSS GAP

GOVERNMENT LICENSE RIGHTS

This invention was made with government support under contract HQ0727-16-D-0006 awarded by the Office of Naval Research (ONR). The government has certain rights in the invention.

FIELD OF THE INVENTION

The invention is the field of power transfer systems for transferring power to vehicles, such as undersea vehicles.

DESCRIPTION OF THE RELATED ART

Prior-art inductive power transfer systems for underwater use or for unmanned autonomous vehicles (UAVs) are in commercial and military use for transmitting 10-15 kilowatt levels of electric power over relatively short distances through air or liquid mediums operating at medium and high frequencies. Most units now use a single-phase stationary electromagnetic fields to transmit power. This presents the problem that alignment of the receiver to power transmitter unit is required to be very accurate. When the spatial alignment is not perfect the electrical transfer efficiency falls off very rapidly with loss of output voltage and reduced capability.

Accordingly there is room for improvement in this field of endeavor.

SUMMARY OF THE INVENTION

A power transfer system has polyphase traveling-wave inductive power transmitters for transferring power across a liquid, gaseous, or solid gap, to/from an inductive power receiver.

According to an aspect of the invention, a power transfer system includes: a polyphase dynamoelectric machine, wherein the dynamoelectric machine includes multiple electrical ports, including primary and secondary electrical ports; a mechanical-inertial energy storage device coupled to the polyphase dynamoelectric machine; polyphase traveling-wave inductive power transmitters coupled to respective of the secondary ports; and polyphase travelling-wave power receivers inductively coupled to the transmitters, and providing electrical power to loads.

According to an embodiment of any paragraph(s) of this summary, the ports include a primary input port, and multiple secondary output ports.

According to an embodiment of any paragraph(s) of this summary, the polyphase traveling-wave inductive power transmitters are coupled to respective of the secondary output ports.

According to an embodiment of any paragraph(s) of this summary, the system further includes a DC-AC power converter coupled to the primary input port that derives power from a power generation source, through a transmission line.

According to an embodiment of any paragraph(s) of this summary, the polyphase dynamoelectric machine further includes respective electrical resonant circuits between the secondary output ports and the respective of the polyphase traveling-wave inductive power transmitters.

According to an embodiment of any paragraph(s) of this summary, the mechanical-inertial energy storage device includes a flywheel that is operatively coupled to a rotor of the dynamoelectric machine.

According to an embodiment of any paragraph(s) of this summary, the dynamoelectric machine and the mechanical-inertial energy storage device are fully bidirectional in power and energy flow, and capable of returning energy to a power generation source.

According to an embodiment of any paragraph(s) of this summary, the induction transmitters accept input power over a range of frequencies, and create a traveling wave with a corresponding range of traveling speeds.

According to an embodiment of any paragraph(s) of this summary, the induction transmitters each have at least four poles.

According to an embodiment of any paragraph(s) of this summary, the induction transmitters have a pole pitch of at least 15 cm (6 inches).

According to an embodiment of any paragraph(s) of this summary, the dynamoelectric machine is a wound DC-field synchronous machine, with controllable excitation.

According to an embodiment of any paragraph(s) of this summary, the dynamoelectric machine is a permanent magnet synchronous machine.

According to an embodiment of any paragraph(s) of this summary, the dynamoelectric machine is a doubly-fed induction machine.

According to an embodiment of any paragraph(s) of this summary, the system further includes an electrochemical energy storage device operatively coupled to the rotor, for providing variable-frequency excitation or direct-current excitation to the rotor.

According to an embodiment of any paragraph(s) of this summary, one of the receivers is a vehicle receiver that is part of a vehicle.

According to an embodiment of any paragraph(s) of this summary, the vehicle receiver is operatively coupled to an additional energy storage device, which serves to provide electrical power to one of the loads, in addition to the power provided by the vehicle receiver.

According to an embodiment of any paragraph(s) of this summary, the additional energy storage device includes a pulse forming network, which is configured to shape and control electrical pulses for power the one of the loads.

According to an embodiment of any paragraph(s) of this summary, the additional energy storage device includes an electrochemical energy storage device, which is configured to provide power to the one of the loads, and is rechargeable by the vehicle receiver.

According to an embodiment of any paragraph(s) of this summary, the coupling between the vehicle receiver and the one of the transmitters allows for bidirectional energy transfer in either direction across the gap.

According to another aspect of the invention, a method of electric power control between a power transfer system and a vehicle includes the steps of: inductively coupling, across a liquid, gaseous, or solid gap, a polyphase traveling-wave inductive power transmitter of the power transfer system, and a receiver of the vehicle; and providing power to one of the transmitter or the receiver, for transfer of the power to the other of the transmitter or the receiver, with load energy to be either dissipated or further energy storage.

According to an embodiment of any paragraph(s) of this summary, the providing power includes providing power from a dynamoelectric machine that is electrically coupled to the transmitter.

According to an embodiment of any paragraph(s) of this summary, the method further includes providing bidirectional power to the dynamoelectric machine from a power source, and from the dynamoelectric machine to the power source, with excess energy from an energy storage device of the vehicle capable of being returned to the power source.

According to an embodiment of any paragraph(s) of this summary, the gap is a water gap, and the vehicle is an underwater vehicle.

According to an embodiment of any paragraph(s) of this summary, the gap is a gaseous gap, and the vehicle operates in a gaseous environment.

According to yet another aspect of the invention, a polyphase dynamoelectric machine is coupled to a primary mechanical-inertial energy storage device, the dynamoelectric machine having multiple stator and rotor ports connected to a polyphase traveling-wave inductive power transmitter apparatus that has means to transfer to a contactless traveling-wave receiver continuous or pulsed polyphase electrical power over a liquid or air gap to an unmanned autonomous vehicle (UAV) or other underwater vehicle for the purpose of recharging or operating a secondary energy storage device for use with pulsed or steady-state electrical loads.

According to an embodiment, the transmission line feeding the polyphase dynamoelectric machine may be limited in surge or pulsed capability whereby the primary source of the pulsed energy is derived from the inertial storage at a first electrical frequency and the majority of this energy is transferred to loads over a contactless polyphase traveling-wave linear induction magnetic assembly at a second and higher frequency.

According to an embodiment, the inductive power transmitter-receiver pair produce a longitudinal propulsive electrodynamic controllable force in addition to power transfer and with the same magnetic field for the purpose of helping to dock and position the subject UAV in its charging station.

According to a further aspect of the invention, a power transfer system includes: a power source; a pair of polyphase dynamoelectric machines operatively coupled to the power source; and a pair of transmitter-receiver pairs operatively coupled to respective of the dynamoelectric machines; wherein each of the transmitter-receiver pairs includes: a polyphase traveling-wave inductive power transmitter; and a polyphase travelling-wave power receiver inductively coupled to the transmitter, and providing electrical power to loads.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

An inductive power transfer system is used for transferring electrical power across a gap, such as an air gap or a liquid gap, such as to unmanned autonomous vehicles (UAVs). The power transfer system is a polyphase system that creates a travelling magnetic field in the air or liquid gap, implementing a resonant electro-magnetic (EM) field to allow larger gap separations and less precise alignments of receiver-to-transmitter position. The power transfer system may have a polyphase dynamoelectric machine attached to primary mechanical-inertial energy storage device with multiple stator and rotor ports connected to a polyphase traveling-wave inductive power transmitter apparatus. The system may be of use in transferring power to underwater vehicles in a subsea salt water environment. Such a power transfer system may part of a larger system for underwater power transfer, for instance at depths of at least 10 km, and/or at distances of 1 to 50 km.

Figure 1:
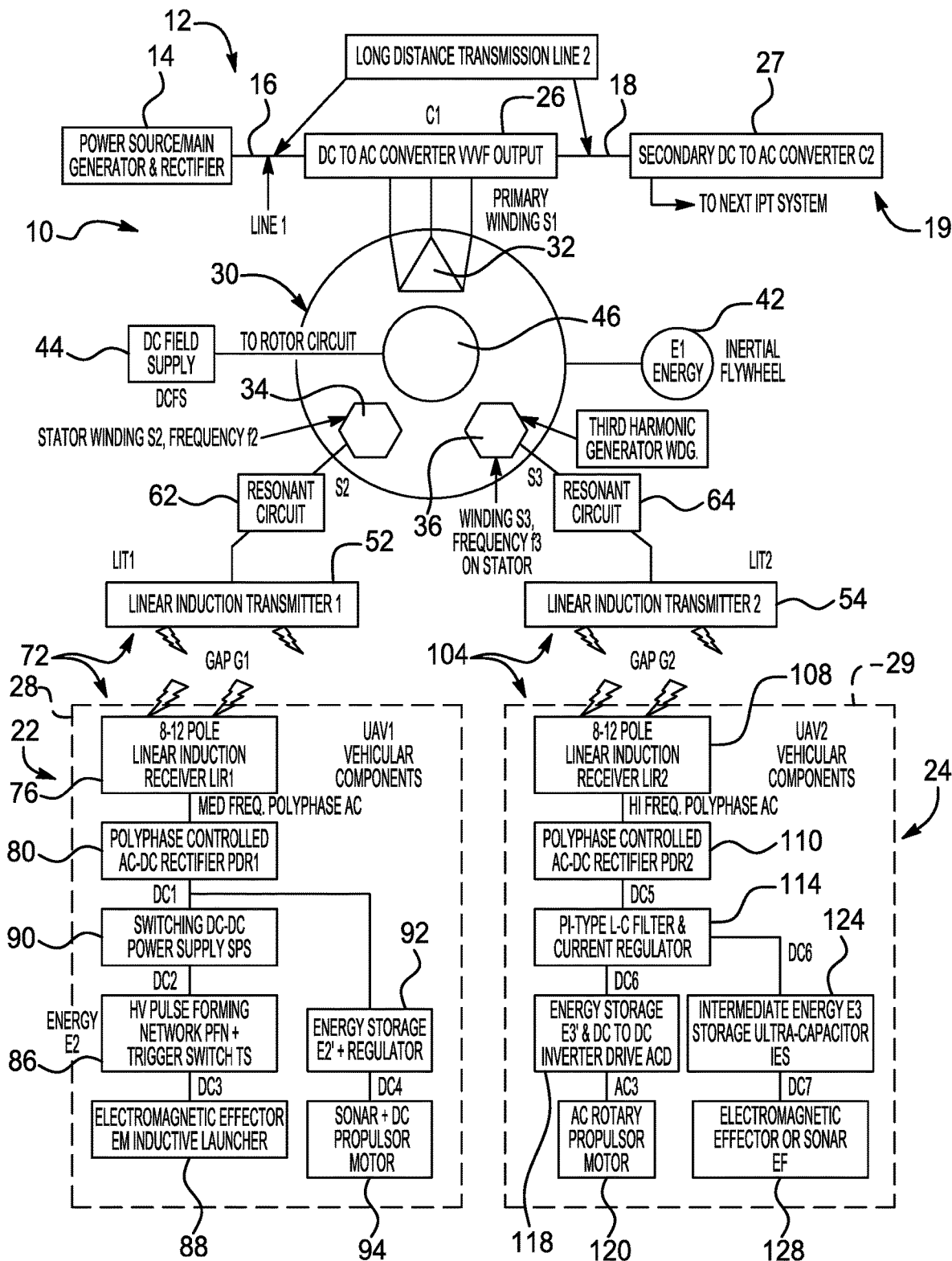
FIG. 1 is a schematic diagram showing a power transfer system in combination with a pair of receiver systems, in accordance with an embodiment of the invention.

FIG. 1 shows a power transfer system 10 that is part of a larger system 12 for providing power at a series of locations under the water, which may be a series of power transfer systems coupled together. The system 12 may include an on-shore power generation system 14, such as a wind turbine, coupled to a series of the power transfer systems 10, which may be underwater, such as under the sea, at a depth of at least 10 km, although other depths are possible. The power transfer systems 10 may be separated by power transmission lines of considerable distance, such as the power lines 16 and 18 shown in FIG. 1. For example the power lines 16 and 18 may have lengths of 1 to 50 km between adjacent of the power transfer systems 10, although other distances are possible.

The larger system 12 may include a series of power transfer systems such as the system 10, for instance including an additional system 19, coupled in series. The individual power transfer systems 10, with energy storage 42, may be able to act to some extent when cut off from the power generation system 14, either separately or in concert with one another, with for instance one of the power transfer systems 10 providing power to other of the power transfer systems.

The power transfer system 10 may be a multi-function, multi-port inductive power transfer system (IPT), in which, in conjunction with power receiver systems, such as power receiver systems 22 and 24, there are two or more stages of stored energy, and multiple stages of power conversion to drive multiple distinctly-different electrical loads on the receiver systems 22 and 24, for instance four (4) distinctly-different electrical loads, three (3) of which are pulsating loads. These are aspects of only one particular embodiment of the invention, and it will be appreciated that many variations are possible on the system 10 shown in FIG. 1 and described below. The system 10 may be adapted for use on long-distance subsea transmission lines whereby a string of multiple power converters, such as the power converters 26 and 27, are connected in series on a constant-current DC or low frequency AC line.

The power receiver systems 22 and 24, which are described in greater detail below, may be parts of separate vehicles 28 and 29. For example the power receiver systems 22 and 24 may be parts of underwater vehicles, for example unmanned underwater vehicles (UUVs), or unmanned autonomous vehicles (UAVs). The power transfer system 10 may be used to power the underwater vehicles 28 and 29, for example to provide energy to the underwater vehicles for the underwater vehicles 28 and 29 to store in on-board energy storage devices, for operation, or to use this energy directly for propulsion or for a dissipative load.

The power transfer system 10 embodiment shown in FIG. 1 includes a multi-port synchronous machine 30 that includes multiple stator windings 32, 34, and 36, and is coupled to an energy storage device 42, such as an inertial flywheel, and to a DC field excitation supply 44. In the description herein, the terms "ports" and "windings" are used to some degree interchangeably, with the same reference numbers applying to both windings and the ports for connecting to those windings. In normal operation the multi-port synchronous machine 30 receives energy from the power converter 26, and directs energy to a pair of linear induction transmitters 52 and 54. The energy sent to the transmitters 52 and 54 passes through respective resonant circuits 62 and 64 on its way to the transmitters 52 and 54.

The winding 32 is an input winding, and the windings 34 and 36 are output windings. The converter 26 feeds polyphase power to the rotating electrical machine 30 at the input winding 32. The machine 30 serves as the primary (inertial) energy storage unit, through the energy storage device 42, and also as a rotating transformer for changing a high voltage potential at input winding to a low voltage potential at output terminals 34 and 36. The converter 26 is a DC to AC converter accepting constant current from the transmission line and having a constant-current or constant-power polyphase output with variable frequency capability. Galvanic isolation is provided from the input winding port 32 to either of the output winding ports 34 and 36. In a first preferred embodiment the electrical machine 30 is a wound DC-field synchronous machine which can transfer power in a bidirectional mode as either a motor or generator. In other embodiments, the electrical machine is a permanent magnet synchronous machine or a doubly-fed induction machine (DFIM), as is discussed in further detail below.

The stator input winding 32 is a delta winding in the illustrated embodiment. In a normal mode, the stator winding 32 is used to charge the flywheel energy store 42 while output windings 34 and 36 are not in use (turned off). When the flywheel 42 is fully charged, the power converter 26 stops supplying power to the input winding 32, and all load energy is taken from the inertial energy storage 42. This minimizes large variations in current or power on the main transmission line 16, 18, which has high impedance and cannot support high energy pulse delivery. The system also allows a combination of power from the converter 26 and energy from the flywheel 42 to feed the loads simultaneously. In the illustrated embodiment there are two polyphase output ports corresponding to the stator windings 34 and 36. However it will be appreciated that a greater number of output ports (and output windings) may be used instead.

The machine 30 is supplied with DC excitation power from the DC field supply 44 to a rotor 46. The rotor 46 Is also used in a motoring mode along with the winding 32 input to charge up the energy storage 42, such as by spinning a flywheel. The system is bidirectional, in that loading energy from the regulator/energy storage 92 or 118 in the UUV or UAV can be routed in a reverse direction to charge up the flywheel 42 if this energy is not dissipated at the final output 94 or 120.

Stator output port 34 powers a multipole linear induction injector/transmitter 52 at frequency f2 in a sealed electromagnetic unit. This creates a traveling-wave magnetic field in the air or liquid medium having gap 72 between the transmitter 52 and a linear induction receiver 76 of the power receiver system 22. The electrical power is transmitted across gap 72 to the linear induction receiver 76, which is also a multipolar polyphase assembly which has substantial mutual coupling to the transmitter 52. The receiver 76 is mounted on the unmanned autonomous vehicle (UAV) 28, and provides power to the UAV 28 for pulsed effectors, navigation, propulsion, and sonar. A series of capacitors that are part of the resonant circuit 62, in combination with a primary inductance of the transmitter 52, provide a resonant frequency to the transmitter 52. This resonant frequency network is excited by the winding 34 at the port of the machine 30 that is coupled to the transmitter 52. The output of receiver 76 is rectified by a multiphase controlled rectifier 80 that produces DC output DC1. The DC1 potential is routed to a switching power supply 90, which generates DC voltage DC2 which is then sent to two different loads.

The first load is a pulse forming network (PFN) 86 consisting of a capacitor-inductor network that produces a high current DC pulsed output DC3 which is connected to a triggering switch and voltage clamp. The PFN 86 performs a function of short-term energy storage, as an energy storage device in the form of a capacitor bank (or other electrochemical energy storage, such as a battery), and produces a low impedance output DC3 necessary for use of an electromagnetic effector 88 at its output. The effector 88 is a pulsed load attached to the unmanned underwater vehicle. "Effectors," as the term is used herein, constitute any of a variety of power-consuming devices, an example being a power-consuming weapon, such as an electric railgun, induction launcher, or high energy laser, or a high-power radar system. A switching power supply (SPS) 90 is between the rectifier 80 and the PFN 86. The controlled AC-DC rectifier 80 also powers an energy storage subsystem and current regulator (FCR) 92, which powers a smaller pulsed load 94, such as a sonar system or a propulsion motor. It should also be understood that the loads coupled to the receiver 76 may be steady-state loads such as communications equipment.

The stator winding 36 is part of a third harmonic generator power source that feeds the second linear induction injector/transmitter 54, through the resonant circuit 64, using an electrostatic capacitor bank that is part of the resonant circuit 64. The transmitter 54 may be an 8 to 12 pole polyphase linear induction traveling-wave electrical machine (capable of creating a travelling-wave magnetic field) with airgap or liquid gap 104 between the transmitter 54 and a corresponding linear induction receiver 108. The receiver 108 is attached to or part of the second unmanned autonomous vehicle 29. One advantage of the illustrated arrangement and windings such as the winding 36, to be described in greater detail below, is that the spatial position of the receiver 108 to the transmitter 54 is not critical. This may allow full power to be transmitted and received when the alignment between the transmitter 54 and the receiver 108 is longitudinally offset by as much as one pole-pitch. In an example embodiment this tolerance for misalignment may be 25 cm (10 inches).

The output of receiver 108 is rectified by a controlled phase delay rectifier 110 to produce DC voltage DC5. The output is then passed through an inductive-capacitive π-type filter 114 to produce a filtered output bus DC6. The output bus DC6 may be at low voltage or high voltage. A portion of power from the output bus DC6 goes into a DC-to-AC inverter drive 118, which in turn powers a submersible linear induction launcher or propulsor rotary motor 120. Such a motor 120 may be characterized by requiring variable frequency AC. Another portion of output bus DC6 voltage goes to an intermediate energy storage system 124. Suitable examples for the energy storage system 124 include an electrostatic ultra-capacitor or an electrochemical battery bank. Energy from the energy storage system 124 may be used to power an electromagnetic effector 128, with a periodic or non-periodic energy pulse.

The system shown in FIG. 1 has four distinct energy sources in its parts: the energy storage device 42 in the power transfer system 10, the energy storage device (the PFN) 86 or 92 in the vehicle 28, and the energy storage device 124 in the vehicle 29, in addition to a possible energy storage capability of the source generator.

The synchronous electrical machine 30 may be operated in a standard control mode that allows transfer of power into or out of the primary (input) winding 32. The electrical machine and its associated power converters are bidirectional. If there exists excess energy in any of the secondary storage subsystems (the PFN 86 or the energy storage device 124) this energy can, if necessary, be transferred back to the DC transmission line and to the source generator, rather than being dissipated at the load sites. Alternately the system allows excess load energy to be fed back to the inertial energy storage 86 for speeding up the flywheel 42 and retaining this energy for the next cycle. The machine configuration shown is a non-standard configuration, and is special in the use of multiple secondary stator windings 34 with high voltage galvanic isolation from the primary winding 32, and use of the tertiary stator winding 36, which is a third harmonic generator winding.

Figure 2A:
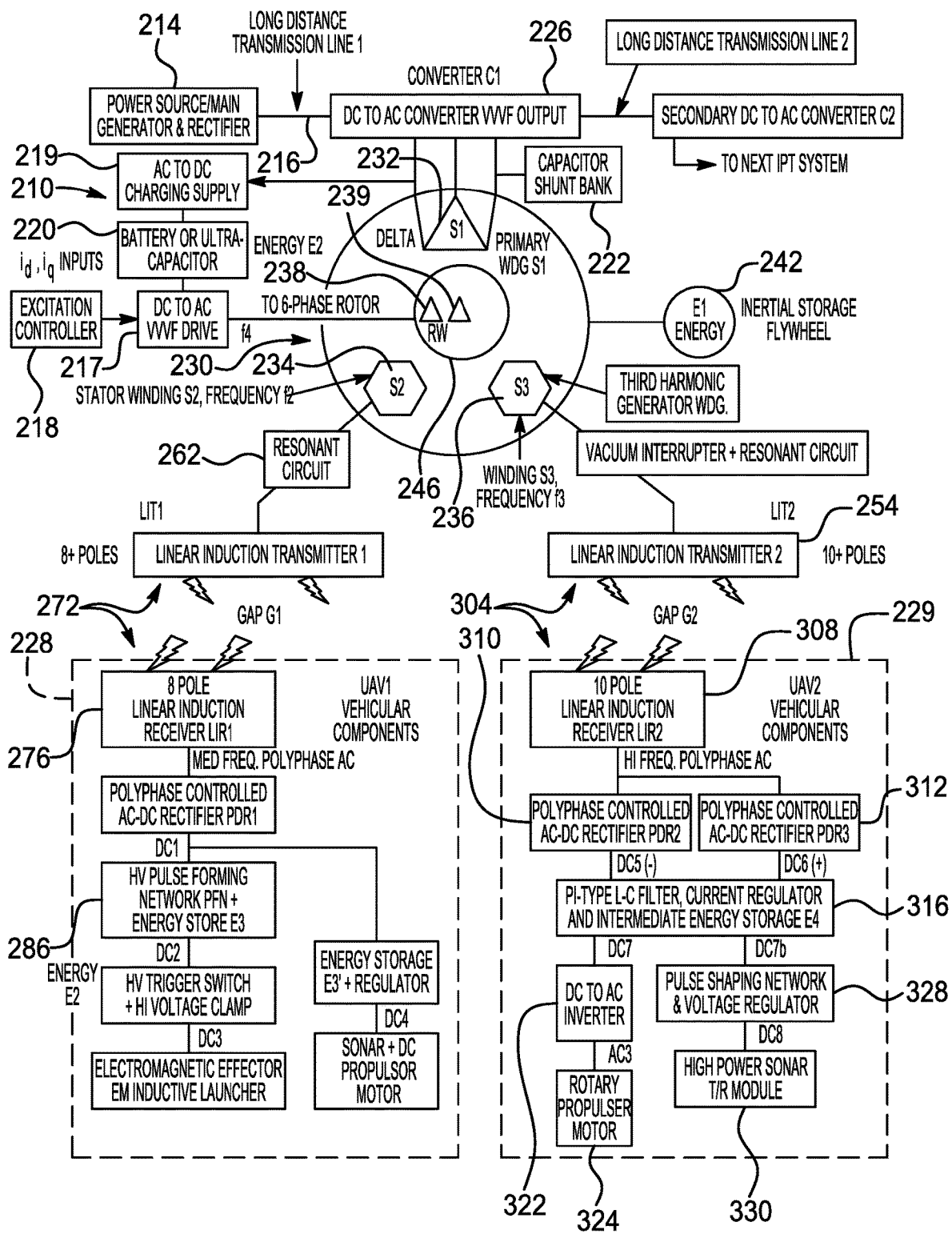
FIG. 2A is a schematic diagram showing a power transfer system in combination with a pair of receiver systems, in accordance with another embodiment of the invention.

Turning now to FIG. 2A, an embodiment power transfer system 210 is shown. The power transfer system 210 includes a doubly-fed induction machine (DFIM) 230 with a total of three stator polyphase windings 232, 234, and 236, and two polyphase rotor windings 238 and 239 for excitation. The main energy storage is an inertial flywheel 242 directly attached to the DFIM 230. The flywheel 242 is charged (rotated) by its coupling to a rotor 246 of the DFIM 230. The flywheel is capable of storing energy E1, and is capable of operating over a wide range of speeds and variable energy storage.

The DFIM 230 is bidirectional and capable of returning energy to a transmission line 216 and a power source 214 that is on the other end of the transmission line 216, if necessary. All power converters of the system 210 are bidirectional. There is a rotor excitation inverter (REI) 217, which converts DC power to AC variable-voltage variable-frequency polyphase current to excite the DFIM 230 through the rotor 246. The REI 217 may convert energy as needed from an energy storage device 220, such as a battery or ultra-capacitor. In a typical energy discharge node as the rotor speed drops, the rotor frequency injected into rotor by the REI 217 is boosted to maintain a nearly constant output frequency at main ports, where the stator windings 234 and 236 are located. This results in higher converter and IPT efficiency. A rotor excitation controller (REC) 218 is operatively coupled to the REI 217.

A path of input current from a converter 226 is provided for powering an AC-DC power converter 219 for charging the excitation battery source 220. The feed is a line from the converter 226 output to the input winding 232. In the event of a transmission line failure, the DFIM winding 232 will act as a self-excited induction generator and generate more than sufficient power for the rotor excitation and/or battery charging. Self-excitation of the 232 winding is sustained down to about 5% of base speed by the combination of a polyphase shunt capacitor bank 222 in parallel with machine winding 232, this being a prior-art technique.

The DFIM 230 is configured to support high power at the ports corresponding to the stator windings 234 and 236, either individually or simultaneously, each with different pulsing rates or steady-state loads. The stator winding 234 feeds a linear induction transmitter 252, and the stator winding 236 feeds a linear induction transmitter 254. The transmitter 252 is fed through a capacitor bank, which is part of a resonant circuit 262 at frequency f2. Inductance of the DFIM machine 230, and capacitance and internal inductance of the stator assembly 234 for the transmitter 252, allow an efficient and higher voltage transfer of power to the vehicle 228 (such as a UAV), across a liquid or air gap 272.

Corresponding to the transmitter 252, for receiving inductive transfer, is a linear induction receiver 276. The power transmission across the gap 272 may be 100 kW or more, to give a non-limiting example value. The transmitter 252 is a special wound assembly using a 3:1 or higher increase in frequency output of the stator winding 234 over the main excitation frequency f1 of the input winding 232. This allows an efficient and higher frequency transfer of power to the vehicle 228. Components of the vehicle 228 that are downstream of the transmitter 252 may be similar to those of the vehicle 28 (FIG. 1), and are not described further here.

For example the stator winding 232 frequency applied may be in a range of 100-400 Hz derived from the inverter variable-frequency output of a converter 226. It is advantageous to keep this frequency no higher than about 700 Hz, since the electrical machine as a motor must operate at suitable speeds to power the flywheel 242. However the frequency output from the stator 236 may be in the range of 600-5000 Hz, which is an efficiency and size advantage to power transfer assemblies, for example a transmitter 254 and a receiver 308, which transmit power across a gap 304. The transmitter 254 and the receiver 308 are multipolar traveling wave linear induction transfer units which as shown are 10-pole units. It will be appreciated that the induction transfer units may have any of a wide variety of other configurations. There so no specific limit to the number of poles for either the transmitter 254 and the receiver 308, and they are only constrained by the physical dimensions of the application site. The product of poles×pole pitch determines the overall length of the transmitter 254 and the receiver 308. This polyphase excitation of the transmitter 254 and the receiver 308 allows the wide range of longitudinal docking locations without need for tight alignment of the transmitter 254 and the receiver 308. The range of possible acceptable misalignment may be similar to that discussed above with regard to the power transfer system 10 (FIG. 1). In addition, the inductive power transmitter-receiver pair can produce a longitudinal propulsive electrodynamic controllable force in addition to power transfer and with the same magnetic field for the purpose of helping to dock and position a vehicle such as a UAV in a charging station, a capability of providing propulsive force simultaneously with inductive power transfer. This may also be a feature of other embodiments disclosed herein.

The AC medium frequency output (the same frequency as applied to the transmitter 254, which may be for instance 1800-15,000 Hz, to give a non-limiting range) of the receiver 308 is fed to a negative bus phase delay rectifier 310 and to a positive bus phase delay rectifier 312. This creates DC bus voltages DC5 and DC6. Each of these voltages feeds into a secondary intermediate energy storage (IES) subsystem 316, which is connected to each of the DC buses 310 and 312, prior to a filter, a current regulator and an insulated gate conducting thyristor (IGCT) current fault limiter, all of which are also part of block 316. The first of the final DC outputs DC7a feeds a DC-AC variable-frequency inverter drive 322 operating a rotary propulsor motor 324. The second of the final DC outputs DC7b feeds a low voltage sonar subsystem 330, after first passing through a pulse-shaping network and voltage regulator in block 328. The rotary propulsor motor 324 is a quasi-steady-state load and the sonar system 330 is a pulsed load, the described power system being able to handle a mixture of load types and a mixture of pulsing rates. The inductive power transfer units are designed to handle pulsed loading and have a traveling electromagnetic field across gaps 272 and 304. Time delays may be limited to under 30 microseconds which allows pulsing at a frequency such as 5000 Hz to be viable.

Master control of the output of the DFIM 230, for both current and voltage, is controlled by the rotor excitation controller (REC) 218 and regulator portion of the DC-AC inverter, the REI 217, feeding rotor port, for example to the rotor windings 238 and 239. In a preferred embodiment the rotor is wound for a 6-phase system composed of two delta windings. This regulator controls both frequency and amplitude of the injected rotor current. It also controls the direct and quadrature axis (d-axis and q-axis) rotor currents and rotor power quantities Pr and Qr for real and reactive power.

The REC 218 may be configured to accomplish one or more of the following: a) boost or retard applied rotor frequency f4 in consort with the machine speed to yield a nearly constant output frequency on the stator windings 234 and 236 as shaft speed is arbitrarily changing in a discharge cycle; b) boost or retard the applied rotor frequency f4 in consort with the machine speed to yield a nearly constant input power as shaft speed is arbitrarily changing in a flywheel charge cycle; c) adjust the magnitude of the quadrature current or quadrature axis power to be minimal for a given real power output and thereby maintain motoring-mode input power factor at a highest possible value; and/or d) regulate machine excitation to develop constant torque on shaft to flywheel (as alternative to constant power mode) in either a charging or discharge cycle according to demand.

It may be desirable that outputs of the stator windings 234 and 236 be capable of being operated at different frequencies and with totally different pulse rates or duty cycles without affecting one another. That is, the two output ports (the outputs from the respective stator windings 234 and 236) may be principally decoupled. Each port feeds a separate vehicle 228 or 229. Thus each of the vehicles 228 and 229 has its own independent docking or mission schedule. The configuration of the DFIM 230 is advantageous as it allows for magnetically and electrically decoupling of the two outputs. To magnetically decouple the outputs 234 and 236, the stator contains windings which share a common frame, yet stator core magnetic structures are isolated although in tandem mechanically, as this allows the two separate rotor windings 238 and 239 each to couple to a distinct stator output winding, and thus effect independent voltage and frequency control of the respective transmitter power input.

The system 210 has multiple energy storage subsystems/devices, including the inertial flywheel energy storage 242 as the main energy storage, with a capacity E1; the energy storage device 220 for the rotor excitation subsystem, which has a capacity E2; an energy storage device 286, part of the vehicle 228, that is magnetic and capacitive storage in a pulse-forming network (PFN), with a capacity E3; and the intermediate energy storage (IES) subsystem 316, which may be a battery or ultra-capacitor energy storage with a capacity of E4, and is part of the vehicle 229. In some embodiments the capacity of inertial storage E1 exceeds the sum of all other energy storage units as E1>E2+E3+E4.

The system may be configured such that if the transmission line 216 is interrupted for whatever reason, or if the input inverter drive 226 or 227 were inoperative, the inertial storage capacity of the inertial flywheel 242 (E1) could carry the system through many operations at full power and potential. The maximum kinetic energy stored by the flywheel 242 may be defined as E0, the typical usable energy E1 is E0/2. This energy is distributed to load energy E3 and E4 as N(E3+E4)/eff, where N is the number of cycles of discharge and eff is the overall system conversion efficiency. In a typical system N can be in a range from 10 to 500 cycles. The auxiliary energy storage units such as the PFN 286 (E3) may serve a purpose of pulse sharpening or changing a low-current long-pulse input into a high current short pulse output as appropriate to a pulsed effector. In most applications the smaller stored energies can be arranged such as E3>E4>E2, whereby the largest of the load energies E3 exceeds the intermediate stored energy E4 and the rotor field supply E2. However other configurations are possible.

Many variations on the above systems are possible. For instance the electrical machines 30 and 230 of FIGS. 1 and 2 can be equipped with greater than three (3) stator windings and greater than two rotor windings to suit a variety of applications requiring multiple UAVs and multiple inductive power transfer units connected to one machine. Furthermore, the inertial flywheel may be directly or indirectly coupled to the electrical machine through a step-up gearbox or similar apparatus. The inertial flywheel can accept and hold for extended periods excess load energy from the PFNs or Energy E2 or E3 which is not used by the effector and cannot be stored for long periods of time in the intermediate energy storage of a highly stressed capacitor bank. Since all of the power conversion apparatus is bidirectional, the system of FIG. 2A also allows energy stored in E2 of the vehicle 228 to be transferred to energy storage E4 of the vehicle 229 through the dual path of the receiver-transmitter pair, and through the electrical machine windings 234 and 236.

In Table 1 are some example values for one possible configuration of the machine 230, and other aspects of the power transfer system 210, in conjunction with the power-receiving and utilization systems of the vehicles 228 and 229. These parameters of a sample DFIM-Inductive Power Transfer-UAV system are sufficient to support an output power of a representative 480 kW, divided into two main UAVs. This is much higher power capability than prior inductive power transfer systems, which are limited by specific hardware or conceptual issues to well under 50 kW. The total stored energy E1 is 10 MJ at the upper speed of 12,000 rpm which reduces to 0.625 MJ capacity at a lower speed such as 3,000 rpm. The tables below involve three different stator voltages and two different UAV receiver output voltages (700 V and 3000 V) to exemplify the wide range of the system. The parameters listed are appropriate for an air or liquid "docking" gap of 2.5 cm (1 inch). An advantage of this system is that longitudinal offset of the UAVs between inductive transmitters and receivers can be large such as 30 cm (12 inches) in addition to its high power high efficiency capability.

TABLE 1

Parameters of 500 kW/500 kVA Inductive Power Transfer with Self Aligning Linear Induction Transmitters/Receivers and Doubly-fed Induction Machine.

| DFIM parameters | |
|---|---|
| Stator Winding S1 | Input Voltage: 5000 V rms L-L, 100-400 Hz, 57.7 Amps/phase |
| Stator Winding S2 | Output Voltage: 690 Volts rms, L-L, 450 Hz, 209 Amps/phase |
| Stator Winding S3 | Output Voltage: 1500 V rms, L-L, 1200-2400 Hz, 96 Amps/phase |
| Rotor Winding R1 + R2 | Input Voltage: 750 Volts L-L, 50 kVA, 3-phase variable frequency |
| Inertial Energy Storage | 10 MJ at 12,000 rpm |
| Flywheel Type | Composite Material |
| Number of stator poles | 4 poles on S1, 4 poles on S2 and 12 poles on S3 |
| Number of rotor poles | 4 poles on R1 and 12 poles on R2 |
| Number of stator slots | 96 total among all groups |
| Number of rotor slots | 24 and 36 |
| Winding S1 Type | 3-phase delta, double-layer lap wound |
| Winding S2 Type | 3-phase wye, double- layer lap wound |
| Winding S3 Type | 3-phase wye, double-layer lap wound |
| Magnetic Field Density | 1.4 Tesla baseline in core |
| Overall Conversion Efficiency | 90% |
| Linear Induction Transmitter #1 | |
| Power rating | 250 kVA, 3- phase establishing a traveling wave field |
| Voltage Input | 1380 Volts L-L, 3 phase |
| Input Current | 105 Amps rms/phase |
| Base Frequency f2 | 450 Hz |
| Resonant Frequency f2r | 600 Hz |
| Winding Type | 8 pole, quadruple delta, double layer lap-wound |
| Air or Liquid Docking Gap surface | 2.5 cm (1 inch) to linear induction receiver electromagnetic |
| Pole Pitch | 30 cm (12 inches) |
| Total machine length | 250 cm (98 inches) |
| Machine width | 25 cm (10 inches) |
| Magnetic Field Density | 1.6 Tesla |
| Linear Induction Transmitter #2 | |
| Power rating | 250 kVA, 3-phase establishing a traveling wave field |
| Voltage Input | 1500 Volts L-L, 3 phase |
| Input Current | 105 Amps rms/phase |

TABLE 1-continued

Parameters of 500 kW/500 kVA Inductive Power Transfer with Self Aligning Linear Induction Transmitters/Receivers and Doubly-fed Induction Machine.

| | |
|---|---|
| Frequency Range f32 | 1200 Hz-2400 Hz |
| Winding Type | 10 pole, quintuple delta, double layer lap-wound |
| Air or Liquid Docking Gap surface | 2.5 cm (1 inch) to linear induction receiver electromagnetic |
| Pole Pitch | 25 cm (10 inches) |
| Total machine length | 257 cm (101 inches) |
| Machine width | 25 cm (10 inches) |
| Magnetic Field Density | 1.6 Tesla peak |
| Magnetic Steel type | Hiperco 50A |
| Linear Induction Receiver #1 | |
| Power rating | 240 kVA, 240 kilowatts Output |
| Voltage Output | 3000 Volts L-L, 3 phase |
| Output Current | 46 Amps rms/phase |
| Base Frequency f2 | 450 Hz |
| Resonant Frequency f2r | 600 Hz |
| Winding Type | 8 pole, quadruple delta, lap wound |
| Pole Pitch | 30 cm (12 inches) |
| Total machine length | 250 cm (98 inches) |
| Machine width | 25 cm (10 inches) |
| Magnetic Field Density | 1.6 Tesla peak |
| Magnetic Steel type | Hiperco 50A |
| Linear Induction Receiver #2 | |
| Power rating | 240 kVA, 240 kilowatts output |
| Voltage Output | 700 Volts L-L, 3 phase |
| Output Current | 198 Amps rms/phase |
| Frequency Range f3r | 1200 Hz-2400 Hz |
| Winding Type | 10 pole, quintuple delta, lap wound |
| Pole Pitch | 25 cm (10 inches) |
| Total machine length | 257 cm (101 inches) |
| Machine width | 25 cm (10 inches) |
| Magnetic Field Density | 1.6 Tesla peak |
| Magnetic Steel type | Hiperco 50A |

Figure 2B:
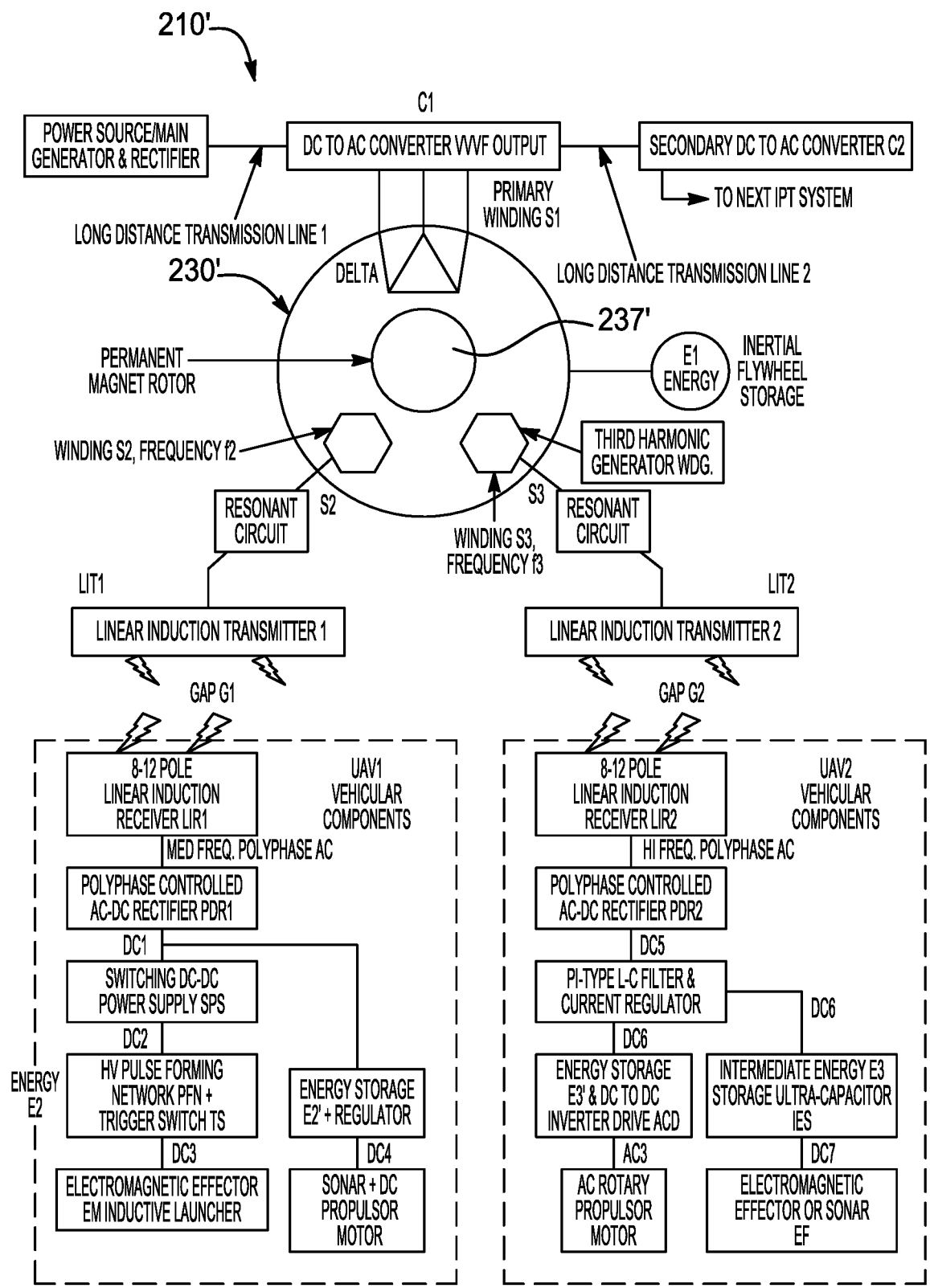
FIG. 2B is a schematic diagram showing an alternative embodiment power transfer system in combination with a pair of receiver systems.

FIG. 2B shows an alternative power transfer system 210' that is similar to the power transfer system 210 (FIG. 2A) except that its DFIM 230' includes a permanent magnet rotor 237'. In other respects the system 210' may be similar to the system 210.

Figure 3:
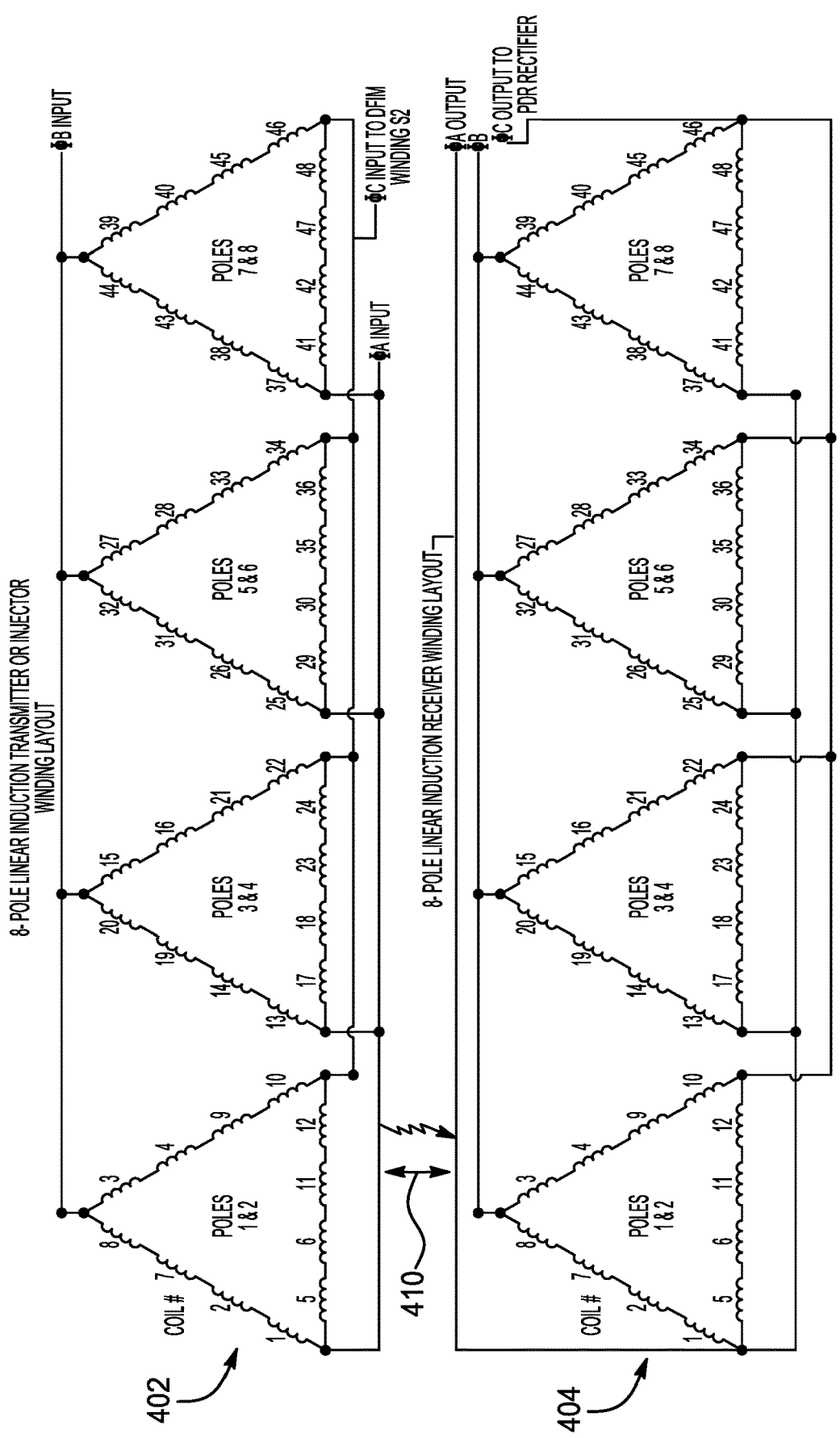
FIG. 3 are winding diagrams for an inductive transmitter and inductive receiver, usable in the system of FIGS. 1 and 2A.

FIG. 3 shows sample winding diagrams for an 8-pole linear inductor transmitter (LIT) 402 and linear induction receiver (LIR) 404 combination as may be used with either a synchronous machine (such as shown in FIG. 1) or a doubly-fed induction machine (such as shown in FIG. 2) main supply, for bidirectionally transferring power inductively across a gap 410. This is a quadruple delta configuration with each of four deltas having two poles in series and all delta groups in parallel. There are 48 coils per side and these are wound as two slots/pole/phase. The longitudinal alignment between LIT 402 and LIR 404 can be offset as much as one pole-pitch e.g. 30 cm (12 inches) without affecting electrical transfer performance. The pole pitch may be at least 15 cm (6 inches). The phase delay rectifier at each LIR output corrects for small differences in LIR output voltage, when there is significant longitudinal offset, to yield a constant output at the HVDC terminals.

Figure 4:
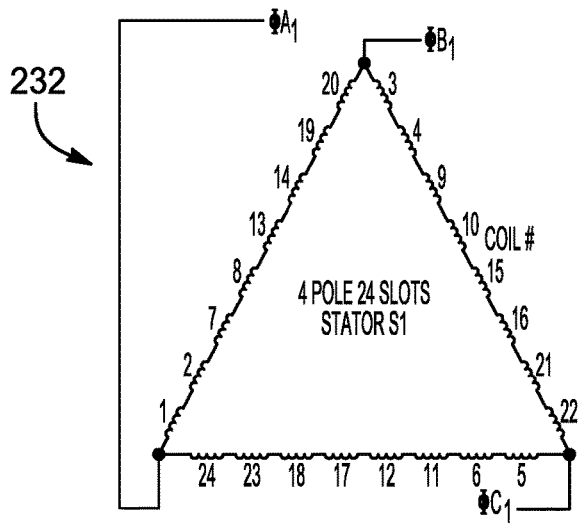
FIG. 4 is a winding diagram for a stator winding of the power transfer system of FIG. 2A.
Figure 5:
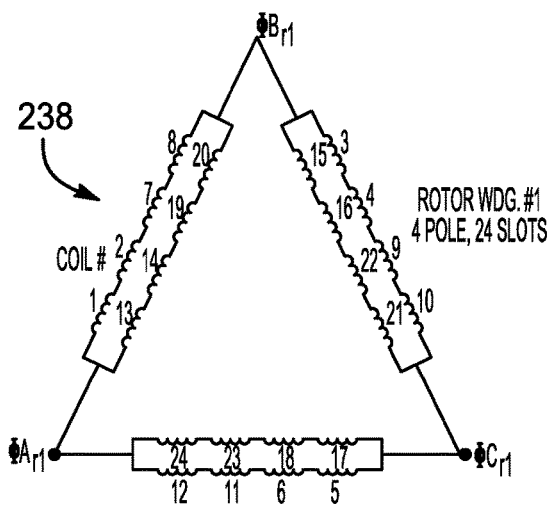
FIG. 5 is a winding diagram for a rotor winding of the power transfer system of FIG. 2A.
Figure 6:
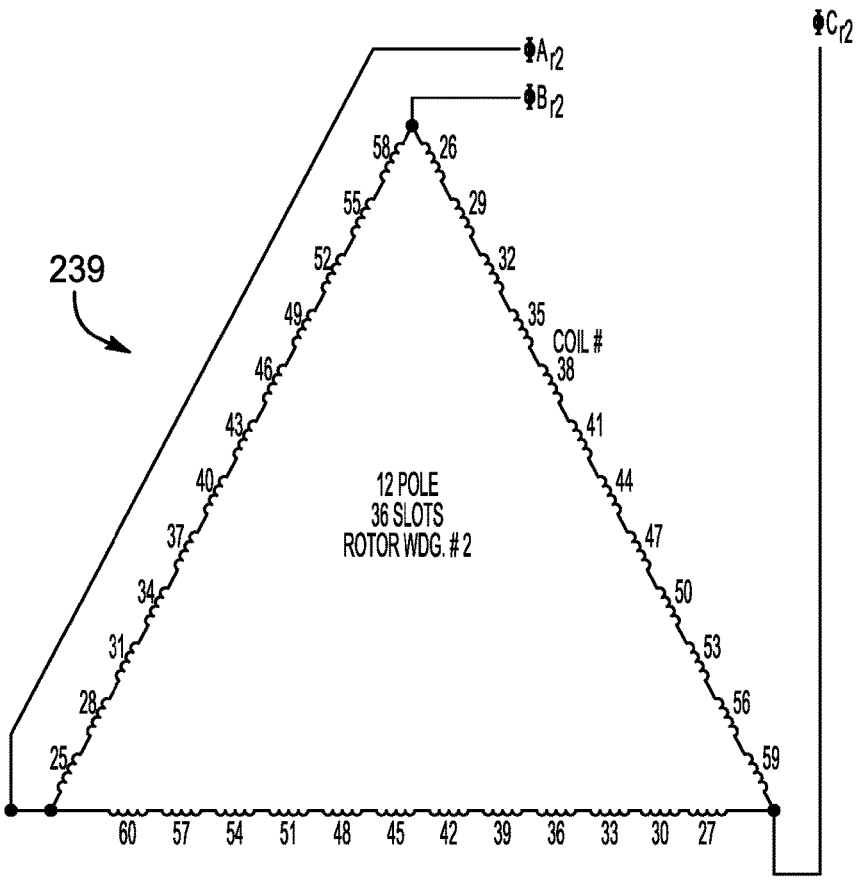
FIG. 6 is a winding diagram for another rotor winding of the power transfer system of FIG. 2A.
Figure 8:
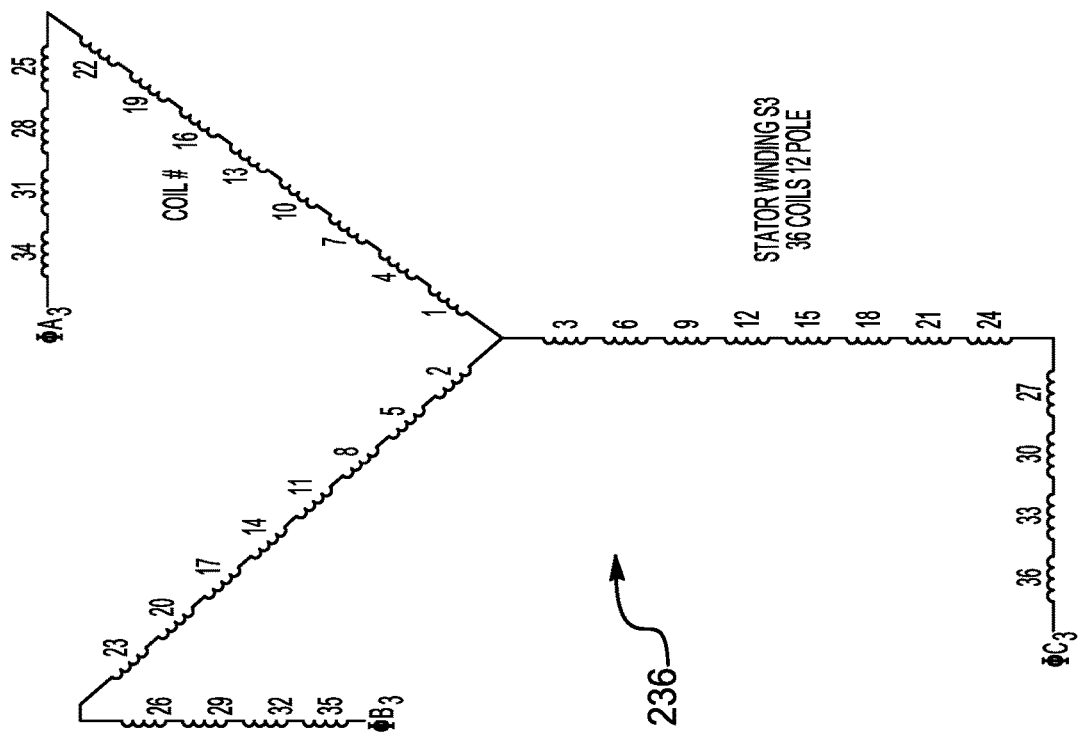
FIG. 8 is a winding diagram for yet another stator winding of the power transfer system of FIG. 2A.
Figure 7:
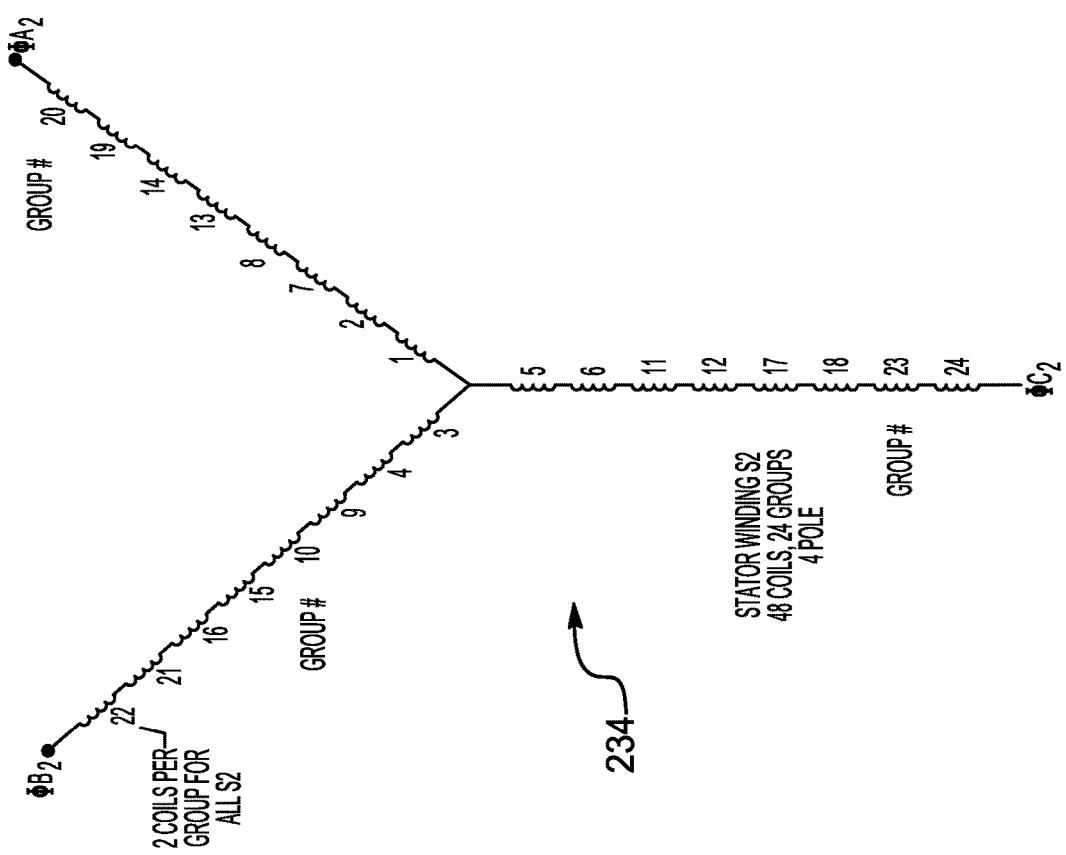
FIG. 7 is a winding diagram for another stator winding of the power transfer system of FIG. 2A.

FIGS. 4-8 show the corresponding winding layout for the machine 230. FIG. 4 shows one possible arrangement for the stator input winding 232. Two rotor circuits 238 and 239 are shown in FIGS. 5 and 6, respectively. Circuit 238 is a 4-pole winding in 24 slots, and circuit 239 is a 12-pole winding in 36 slots. The corresponding stator output windings are 234 and 236, FIGS. 7 and 8, respectively, can output e.g. 400 Hz and 1200 Hz base frequency respectively. These two polyphase windings are magnetically isolated, although in a common machine frame. There may be a wide variety of pole combinations. By operating the rotor inverter for circuit 239 at reverse phase sequence the stator output frequency can be doubled from 1200 Hz to 2400 Hz. In this arrangement with a 6:1 difference in stator output frequencies to the respective linear induction transmitters, there is minimal electrical coupling of 234 to 236 for both pulse duty and steady state operation. The windings 234 and 236 are wound in separate slots on a common rotor, and fundamentally have different pole numbers and different slot combinations (36 and 48), yet share a common stored energy 242. It will be appreciated that a wide variety of other configurations are possible for the windings shown in FIGS. 4-8.

Figure 9:
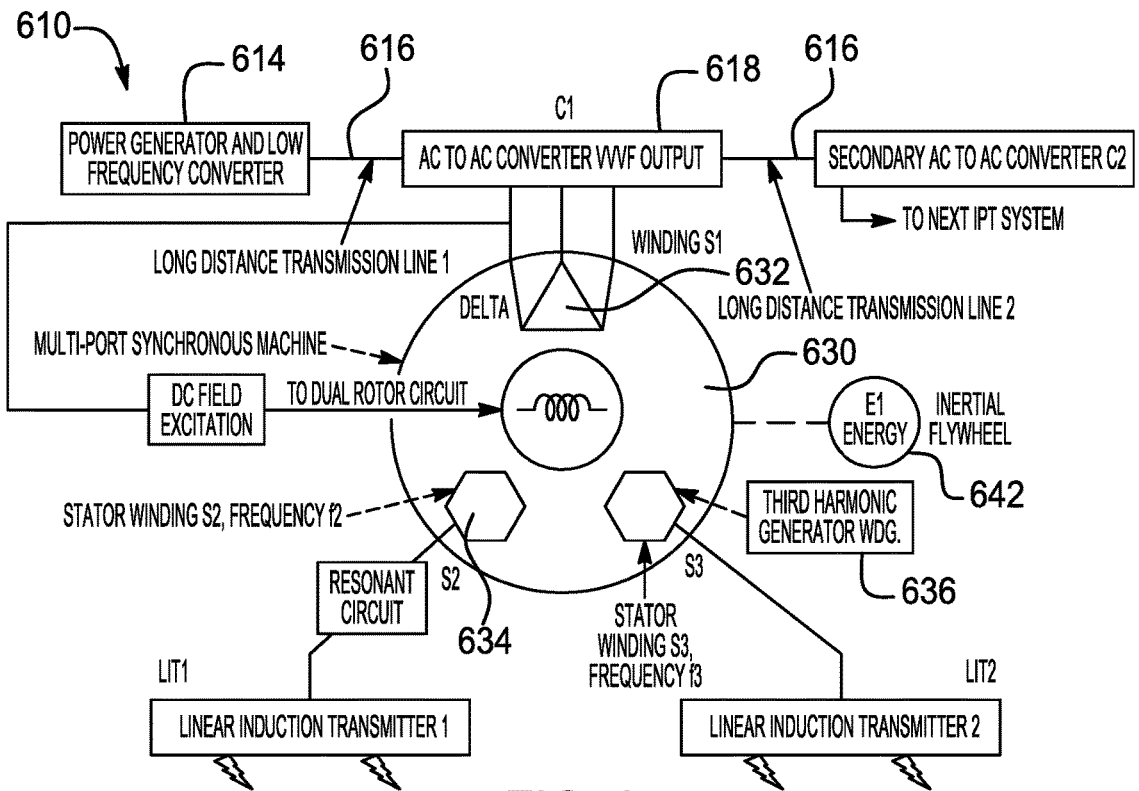
FIG. 9 is a schematic diagram showing a power transfer system in accordance with yet another embodiment of the invention.

FIG. 9 shows a variation of the system 10 (FIG. 1), a system 610 in which a power generation source 618 provides a low-frequency input to a long distance AC transmission line 616. A converter 614 is an AC-to-AC converter for operating of the synchronous electrical machine 630 in a charging mode. The output of the converter 618 is variable-voltage and variable-frequency as appropriate to operating a flywheel 642 up to a high speed such as 12,000 rpm which requires a frequency input of 1-400 Hz, if a 4-pole machine is chosen. The electrical machine 630 also has a 12 pole winding to generate 1200 Hz in winding 636, whereas winding 634 of 4 poles will output 400 Hz when the flywheel 642 is at top speed. Excitation to the rotor fields excitation control is a tapped connection to the incoming line power. These characteristics of the windings 634 and 636 are just examples, and many variations are possible. The stator winding 632 can be wye or delta wound and may be tightly coupled to the windings 634 and 636. In other respects the system 610 may be similar to the system 10.

Figure 10:
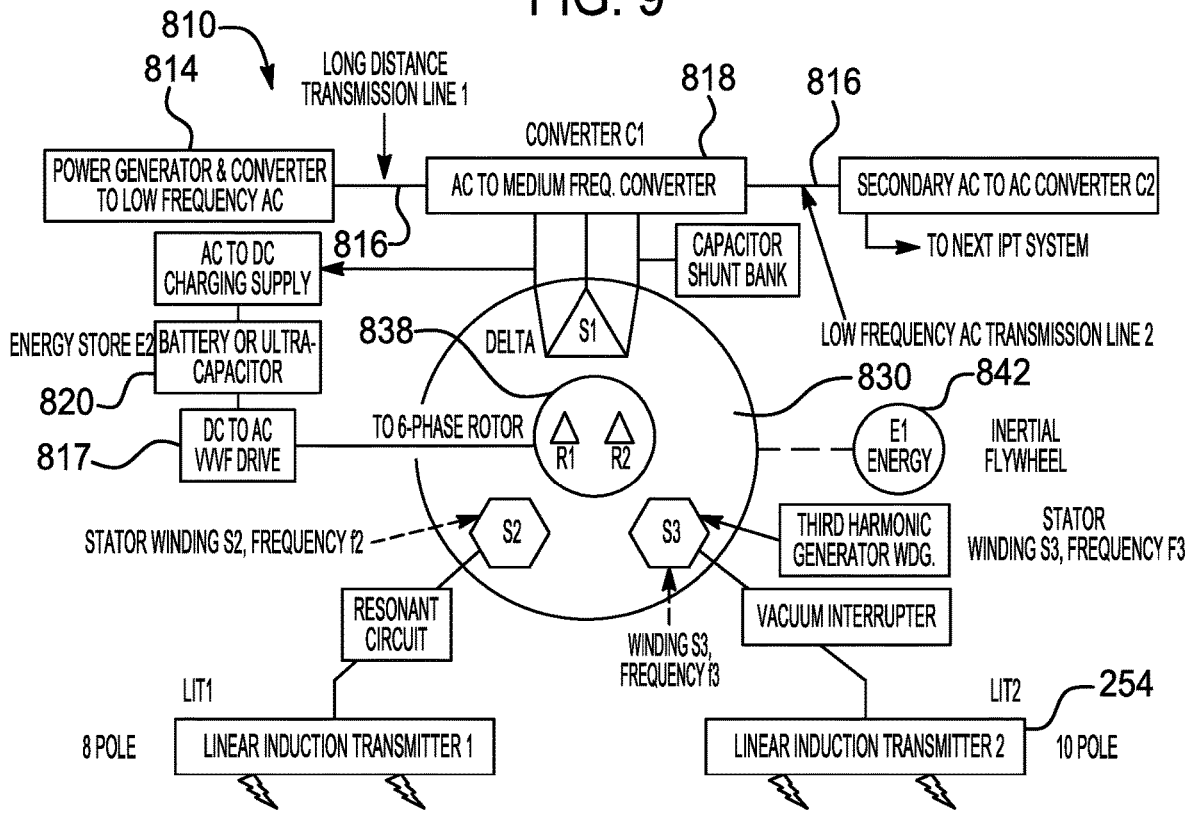
FIG. 10 is a schematic diagram showing a power transfer system in accordance with still another embodiment of the invention.

FIG. 10 shows a system 810, a variation of the system 210 (FIG. 2A). In the system 810 a power generation source 818 provides a low-frequency input to a long distance AC transmission line 816. A converter 814 is an AC-to-AC converter for operating of the doubly-fed induction electrical machine 830 in a charging mode. The output of the converter 814 is a medium- and variable-voltage, variable-frequency (VVVF) output, as appropriate to operating an inertial energy store 842 up to a high speed such as 12,000 rpm which requires a frequency of 1-400 Hz or rotor frequency control. The system 810 contains a substantial energy source 820, which may be an ultra-capacitor or electrochemical battery, and which provides means of excitation power to an inverter 817 driving a rotor circuit 838. In a preferred embodiment the VVVF inverter 817 is divided into two output converters which are independent in frequency and magnitude output and power the DFIM 830 through two sets of three-phase slip rings and collectors connected to two delta rotor windings R1 and R2, parts of the rotor circuit 838.

Figure 11:
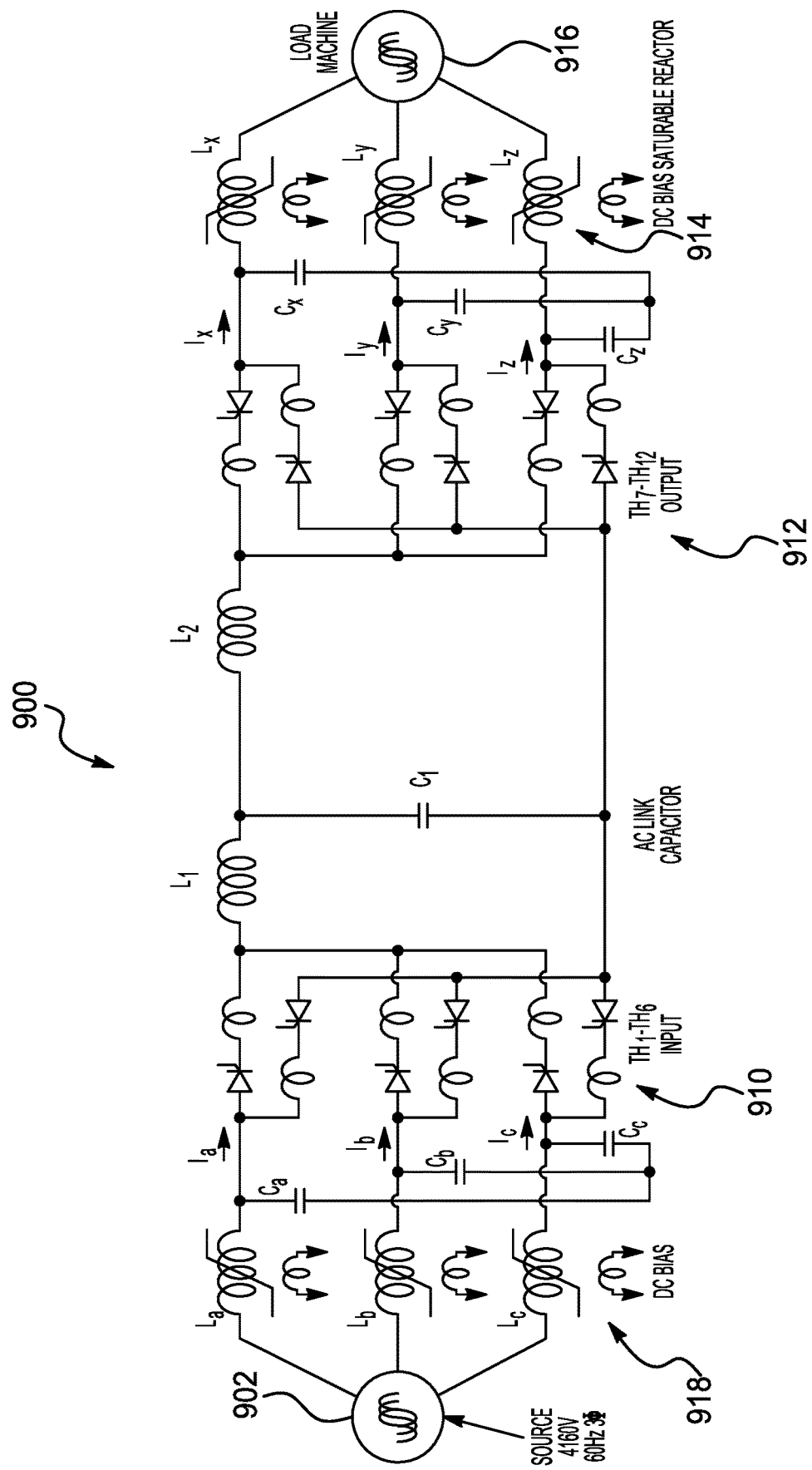
FIG. 11 is a schematic diagram of an AC-to-AC long-distance transmission system usable with the power transfer systems of FIGS. 9 and 10.

FIG. 11 shows a simplified electrical schematic of an AC-to-AC long-distance transmission system 900 that would be usable in the systems shown in FIGS. 9 and 10, and of the "AC link" type appropriate for low frequency and showing an electrical generator source 902 and load electrical machine 916 for stator winding S1 input only. In general the machines 902 and 916 can be induction or synchronous generators. Load inductors 914 are saturable and controllable polyphase inductors (with DC bias magnetization control) to assist with proper line regulation with pulsating loads on long transmission lines or if multiple electrical load machines are placed on the transmission line in series or in parallel. Inductors 918 are saturable controlled polyphase inductors with DC bias magnetization to assist with input power regulation with pulsed loads. The power converters 910 and 912 are "AC Link" converters known in prior art but which utilize the transmission line inductance L1 and L2 and line stray capacitance C1 to assist with natural commutation of the converters. There is no DC link in this converter system and switching devices perform a soft switching of the loads without need for forced commutation. This circuit allows use of high-power high-voltage thyristors or IGCTs for switching devices and does not require use of lower power and less reliable IGBT or power MOSFET devices. FIG. 11 also shows capacitive power factor correction at both input and output sides using elements C1-C6.

Figure 12:
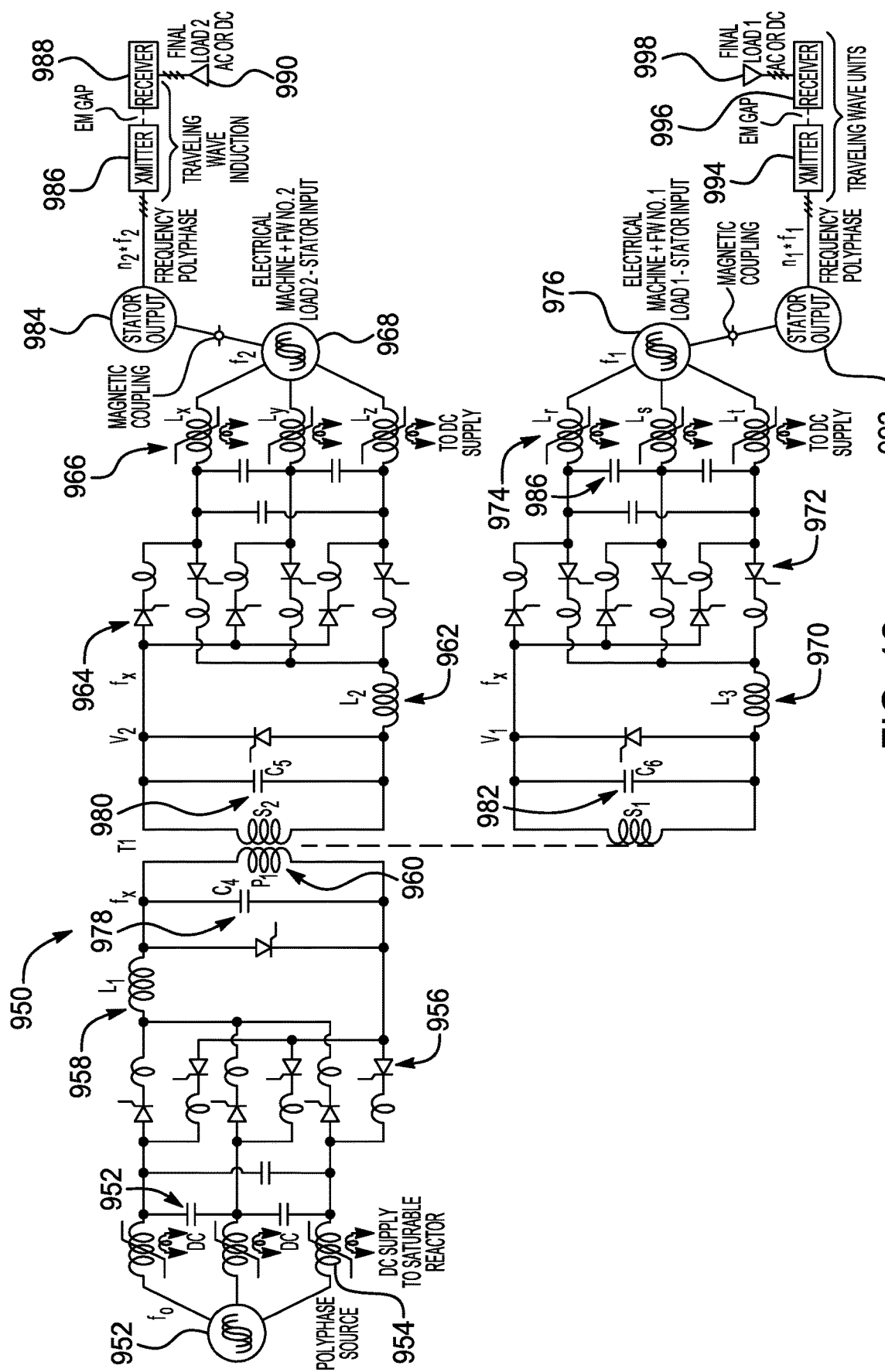
FIG. 12 is a schematic diagram of a multi-machine system and dual transmitter-receiver set with special buffering of source, in accordance with an embodiment of the invention.

FIG. 12 shows a schematic of an AC-to-AC long-distance transmission system 950 that uses the dual loads of the system shown in FIGS. 1, 2A, and 2B yet distinct in that two electrical load machines are used and two distinct sets of transmitter—receiver pairs are used again with a traveling wave magnetic field in the liquid or air gap. The system uses a set of AC link power converters which are modified from prior art by use of saturable reactors at the source and at each load electrical machine stator input. The transmission line is represented by inductance L1 958.

The AC source is a polyphase generator of medium frequency fo and this frequency is converted to lower frequency fx after the first AC input converter stage with thyristors 956 feeding power transformer T1 (960) at its primary winding P1. The transformer has two output windings S1 and S2. The resonance frequency of the AC link is controlled by the combination of L1, L2 & L3 (reference numbers 958, 962, and 970, respectively) in combination with AC capacitors C4, C5 and C6 (reference numbers 978, 980, and 982, respectively). Capacitors 953 at input serve to correct system power factor. The polyphase AC capacitors 984 and 986 at the load machines serve to compensate for inherent power factor of the load machines; this reactive compensation aids in optimum overall power transfer. The second stage of frequency conversion for electrical load machine No. 1 stator winding 976 is produced by thyristor switching network 972 creating output frequency f1 which is significantly higher than frequency fx or fo. The third stage of frequency conversion for electrical load machine No. 2 stator winding 968 is produced by thyristor switching network 964 creating output frequency f2 which is significantly higher than frequency fx or fo. It is an objective of this invention to have relatively high frequency applied to the transmitter-receiver pairs with relatively low cost and simple power converters of the type shown. The two sets of polyphase saturable reactors 966 and 974 which are controlled by separate sets of DC bias supplies, control machine stator input current and power regulation in addition to the thyristor switching.

The transformer T1 serves several purposes. It may be desirable to have a high voltage line for example 15 kV input from source 952 yet load circuits may be a lower voltage such as 4 kV and thus transformer would normally be a step-down unit. The transformer allows two or more load circuits each operating at different voltage levels V1 and V2 to be combined at a common point such as L1 output (958) for combining or sharing power transfer. The transformer also accomplishes galvanic isolation and limits fault currents from load from severely impacting front-end of the system or source. The transformer can be manufactured of high-permeability magnetic steel core such as Hiperco 50A or use a nano-crystalline magnetic core; either type of material allows medium or high frequency to be applied.

Each electrical machine 976 and 968 has a distinct stator input frequency f1 or f2 respectively and a distinct operating shaft speed. Each electrical machine has its own flywheel energy storage unit attached; since the two shaft speeds are independent of each other, the flywheels can have different kinetic energies and different total stored energy ratings. In a preferred embodiment each electrical machine 968 and 976 is a doubly-fed induction machine as shown in FIG. 10. The electrical machine 968 has a stator polyphase output winding 984 which has an output frequency of n2*f2 where n2 may be multiplier of 2, 4, 6 or any even number representing the ratio of stator output poles to stator input poles. This higher frequency n2*f2 is fed to the transmitter traveling wave unit 986 which is coupled to receiver 988 and to the AC load or DC load 990 after rectification if required. The machine 976 has a stator polyphase output winding 992 which has an output frequency of n1*f1 where n1 may be multiplier of 2, 4, 6 or any even number representing the ratio of stator output poles to stator input poles. This higher frequency n1*f1 is fed to the transmitter traveling wave unit 994 which is coupled to receiver 996 and to the AC load or DC load 998 after rectification if required.

One advantage of this system is that as one machine set is decelerating the flywheel and decreasing kinetic energy upon discharging its load, the other machine set can be accelerating the flywheel and increasing its kinetic energy while in a waiting mode before releasing its kinetic energy to its respective load. In this fashion if the two machine sets have equally rated flywheel maximum stored energy, the total power draw from the source is buffered and averaged in time in comparison to having a single electrical machine and single flywheel as its load.

Figure 13:
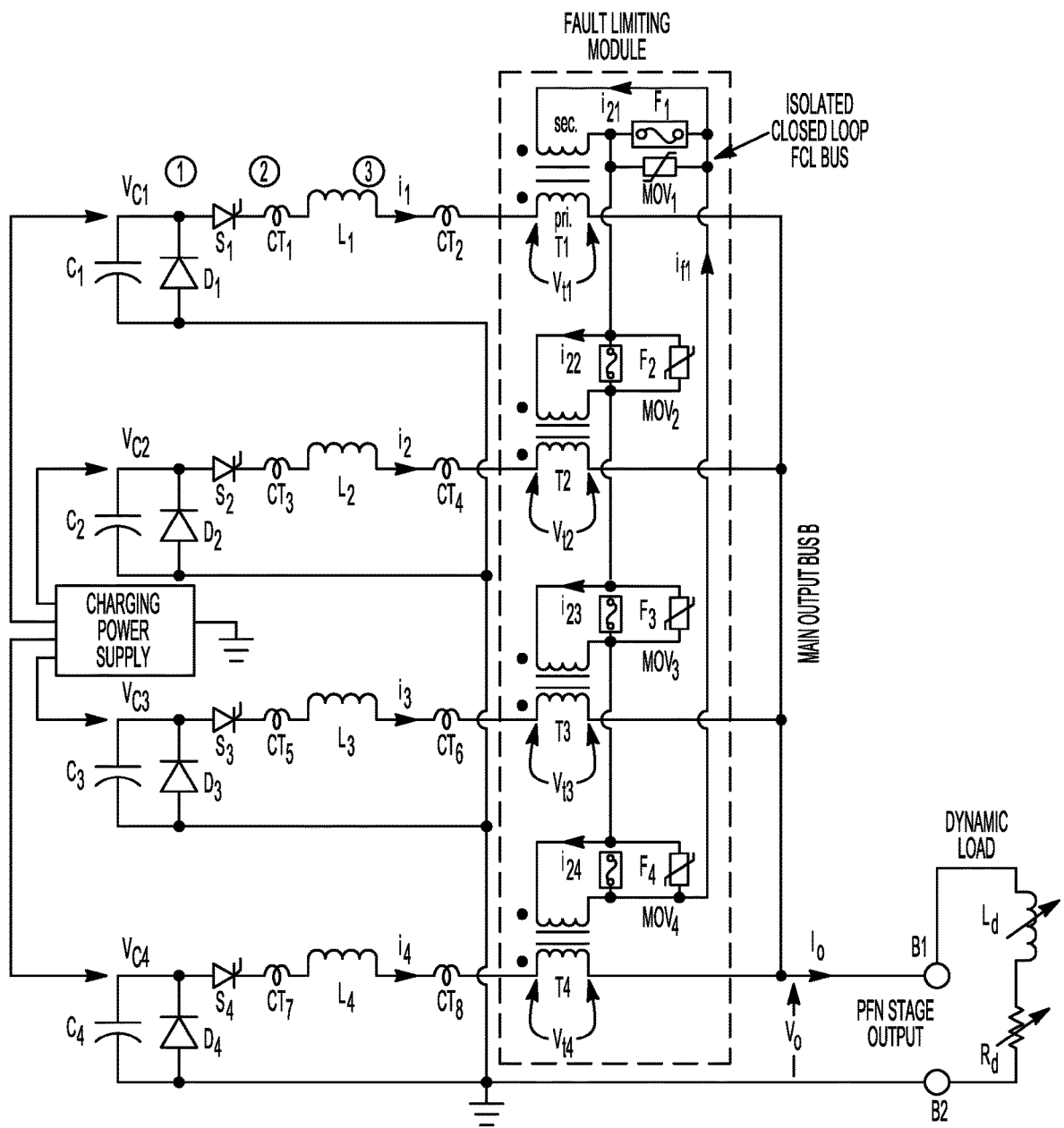
FIG. 13 shows a prior art four-stage pulse forming network and dynamic load.

FIG. 13 shows a schematic of a prior art four-stage pulse forming network (PFN) and associated resistive-inductive dynamic load as disclosed in U.S. Pat. No. 9,705,314, assigned to Raytheon Company, the specification and drawings of which are incorporated by reference. The combination of the four DC capacitors C1-C4 and DC storage inductor L1-L4 constitute energy storage capacity of the PFN. The charging power supply is provided by the combination of the electrical machine stator AC output and an associated full wave bridge rectifier to produce the adjustable DC charging supply voltage and hence the adjustable energy storage level. Such a PFN may be used as part of various embodiments disclosed herein.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power transfer system comprising:
a polyphase dynamoelectric machine, wherein the dynamoelectric machine includes multiple electrical ports, including primary and secondary electrical ports; wherein the ports include multiple secondary output ports;
a mechanical-inertial energy storage device coupled to the polyphase dynamoelectric machine;
polyphase traveling-wave inductive power transmitters coupled to respective of the multiple secondary output ports; wherein the multiple secondary electrical output ports provide output power having a first frequency to the polyphase traveling-wave inductive power transmitters; and
polyphase traveling-wave power receivers inductively coupled to the transmitters; wherein the polyphase traveling-wave inductive power transmitters transmit electrical power having a second frequency that is higher than the first frequency to the polyphase traveling-wave receivers; wherein the polyphase traveling-wave receivers provide the electrical power to loads.

2. The power transfer system of claim 1, wherein the ports further include a primary input port; and further comprising a DC-AC power converter coupled to the primary input port that derives power from a power generation source, through a transmission line configured to provide variable-frequency power to the primary input port.

3. The power transfer system of claim 2, wherein the polyphase dynamoelectric machine further includes respective electrical resonant circuits between the secondary output ports and the respective of the polyphase traveling-wave inductive power transmitters, configured to enhance power transfer efficiency to the transmitter.

4. The power transfer system of claim 1, wherein the mechanical-inertial energy storage device includes a flywheel that is operatively coupled to a rotor of the dynamoelectric machine, with the energy storage device configured to have substantially equal charge and discharge rates to and from the flywheel.

5. The power transfer system of claim 1, wherein the dynamoelectric machine and the mechanical-inertial energy storage device are fully bidirectional in power and energy flow, and capable of returning energy to a power generation source and capable of directing energy to loads coupled to the receivers.

6. The power transfer system of claim 1, wherein the induction transmitters accept input power over a range of frequencies, and create a traveling magnetic wave with a corresponding range of traveling speeds, to enable the transmitters to produce a controllable longitudinal propulsive force on the receivers.

7. The power transfer system of claim 6, wherein the induction transmitters each have at least four poles.

8. The power transfer system of claim 6, wherein the induction transmitters have a pole pitch of at least 15 cm (6 inches).

9. The power transfer system of claim 6, wherein the receivers are configured to use the longitudinal propulsive force to assist docking between the transmitters and the receivers.

10. The power transfer system of claim 1, wherein the dynamoelectric machine is a wound DC-field synchronous machine, with controllable excitation.

11. The power transfer system of claim 1, wherein the dynamoelectric machine is a permanent magnet synchronous machine.

12. The power transfer system of claim 1, wherein the dynamoelectric machine is a doubly-fed induction machine.

13. The power transfer system of claim 12, wherein the dynamoelectric machine is a wound DC-field synchronous machine, with controllable excitation; and further comprising an electrochemical energy storage device operatively coupled to the rotor, for providing variable-frequency excitation or direct-current excitation to the rotor.

14. The power transfer system of claim 1, wherein one of the receivers is a vehicle receiver that is part of a vehicle.

15. The power transfer system of claim 14, wherein the vehicle receiver is operatively coupled to an additional energy storage device, which serves to provide electrical power to one of the loads, in addition to the power provided by the vehicle receiver.

16. The power transfer system of claim 15, wherein the additional energy storage device includes a pulse forming network, which is configured to shape and control electrical pulses for power the one of the loads.

17. The power transfer system of claim 15, wherein the additional energy storage device includes an electrochemical energy storage device, which is configured to provide power to the one of the loads, and is rechargeable by the vehicle receiver.

18. The power transfer system of claim 14, wherein the coupling between the vehicle receiver and the one of the transmitters allows for bidirectional energy transfer in either direction across a liquid or gaseous gap.

19. A method of electric power control between a power transfer system and a vehicle, the method comprising:
inductively coupling, across a liquid or gaseous gap, a polyphase traveling-wave inductive power transmitter of the power transfer system, and a receiver of the vehicle; and
providing power to one of the transmitter or the receiver, for transfer of the power to the other of the transmitter or the receiver; wherein the providing power to the one of the transmitter or the receiver includes providing power from a dynamoelectric machine that is electrically coupled to the transmitter; and further comprising providing bidirectional power to the dynamoelectric machine from a power source, and from the dynamoelectric machine to the power source, with excess energy from an energy storage device of the vehicle capable of being returned to the power source.

20. A power transfer system comprising:
a power source;
a pair of polyphase dynamoelectric machines operatively coupled to the power source; and
a pair of transmitter-receiver pairs operatively coupled to respective of the dynamoelectric machines; wherein each of the transmitter-receiver pairs includes:
a polyphase traveling-wave inductive power transmitter; and
a polyphase travelling-wave power receiver inductively coupled to the transmitter, wherein the polyphase traveling-wave inductive power transmitter transmits electrical power having a frequency that is higher than a frequency of an input power received by the polyphase traveling-wave inductive power transmitter; wherein the polyphase traveling-wave power receiver provides electrical power to loads.

* * * * *